US012263736B2

(12) United States Patent
Ryton

(10) Patent No.: US 12,263,736 B2
(45) Date of Patent: Apr. 1, 2025

(54) ELECTRO-HYDRAULIC PROPULSION SYSTEM COMBINED POWER MODULE

(71) Applicant: EVECTEK, LTD., Par (GB)

(72) Inventor: George Ryton, Par (GB)

(73) Assignee: EVECTEK, LTD., Par (GB)

( * ) Notice: Subject to any disclaimer, the term of this patent is extended or adjusted under 35 U.S.C. 154(b) by 272 days.

(21) Appl. No.: 17/787,889

(22) PCT Filed: Dec. 23, 2020

(86) PCT No.: PCT/GB2020/053364
§ 371 (c)(1),
(2) Date: Jun. 21, 2022

(87) PCT Pub. No.: WO2021/130497
PCT Pub. Date: Jul. 1, 2021

(65) Prior Publication Data
US 2023/0017589 A1 Jan. 19, 2023

(30) Foreign Application Priority Data
Dec. 23, 2019 (GB) ..................................... 1919160

(51) Int. Cl.
*B60K 6/00* (2007.10)
*B60K 7/00* (2006.01)
*F15B 15/08* (2006.01)

(52) U.S. Cl.
CPC ............. *B60K 7/0015* (2013.01); *B60K 6/00* (2013.01); *F15B 15/088* (2013.01); *F15B 2211/20515* (2013.01); *F15B 2211/212* (2013.01); *F15B 2211/30525* (2013.01)

(58) Field of Classification Search
CPC ....... B60K 7/0015; B60K 6/00; F15B 15/088; F15B 2211/20515; F15B 2211/212; F15B 2211/30525
USPC ....................................................... 180/305
See application file for complete search history.

(56) References Cited

U.S. PATENT DOCUMENTS

| | | | |
|---|---|---|---|
| 10,267,149 B2* | 4/2019 | Erlston | B60K 6/20 |
| 10,513,195 B2* | 12/2019 | Hughey | B60L 58/10 |
| 11,801,824 B2* | 10/2023 | Dalum | B60W 30/1888 |
| 2009/0095549 A1* | 4/2009 | Dalum | B60L 1/00 |
| | | | 180/65.265 |

(Continued)

Primary Examiner — James A Shriver, II
Assistant Examiner — Hilary L Johns
(74) Attorney, Agent, or Firm — Weiss & Moy, PC; Jeffrey D. Moy

(57) ABSTRACT

A vehicle drive system, comprises a battery, a power unit in a housing, which itself comprises at least one electric motor/generator, capable of being driven as a motor by the battery or of charging the battery as a generator, at least one hydraulic motor/pump, capable of being driven by the electric motor/generator to pressurize hydraulic fluid, or of being driven by pressurized hydraulic fluid to power the motor generator as a generator, a hydraulic rail communicating the pump, a directional control valves communicating with the hydraulic rail, at least one accumulator for storing pressurized hydraulic fluid, wheel drives capable of being driven by pressurized hydraulic fluid, a hydraulic circuit connecting the directional control valves of the motor housing to the accumulator and wheel drives, and a control system for controlling the operation of the battery, power unit and wheel drives.

3 Claims, 22 Drawing Sheets

(56) References Cited

U.S. PATENT DOCUMENTS

| | | | |
|---|---|---|---|
| 2010/0175579 A1* | 7/2010 | Read | B61C 7/00 |
| | | | 105/62.1 |
| 2015/0033938 A1* | 2/2015 | Erlston | H02K 7/116 |
| | | | 91/55 |
| 2015/0176607 A1* | 6/2015 | Al-Atat | H02J 9/08 |
| | | | 60/413 |
| 2015/0180281 A1* | 6/2015 | Al-Atat | H02K 7/1815 |
| | | | 290/51 |
| 2015/0291037 A1* | 10/2015 | Pritchard | B60W 10/00 |
| | | | 318/376 |
| 2016/0152138 A1* | 6/2016 | McCann | B60K 1/02 |
| | | | 180/65.265 |
| 2019/0136874 A1* | 5/2019 | Olesen | E02F 9/2217 |
| 2020/0018328 A1* | 1/2020 | Wang | F15B 11/17 |
| 2021/0008974 A1* | 1/2021 | Ryton | F16D 61/00 |
| 2023/0017589 A1* | 1/2023 | Ryton | F16H 39/02 |
| 2023/0037398 A1* | 2/2023 | Ryton | B60K 7/0015 |

* cited by examiner

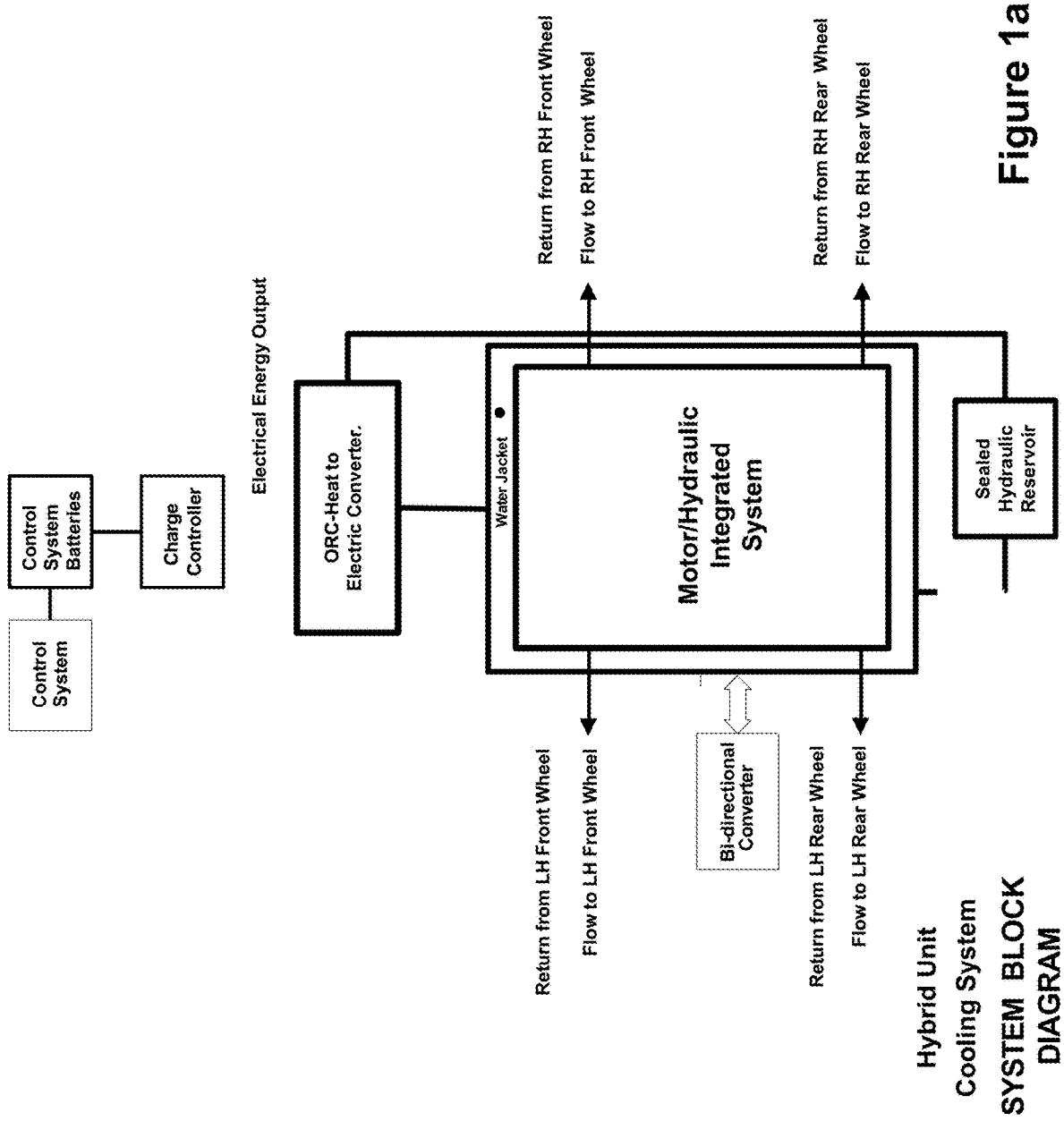

VIEW F

Fig 11 — SECTION B-B

Fig 17   SECTION D-D TOP-HYDRAULIC PRESSURE SUPPLY FROM PUMP

Fig 18  SECTION E-E HYDRAULIC RETURN

ELECTRO-HYDRAULIC PROPULSION SYSTEM COMBINED POWER MODULE

This invention relates to a combined singular power module containing a decoupled Electric Motor and Hydraulic Valving system designed to be used in Multi wheel Vehicles of all descriptions. The invention results in a simpler more compact, lighter and therefore more cost-effective solution to the hybrid electric internal combustion engine and hydraulic-electric power units that exist today.

BACKGROUND OF THE INVENTION

As we move headlong into the green era, we are looking for practical solutions to the planet's reliance on our mineral and oil resources for energy. This solution addresses both these elements buy reducing costly materials (Metals and rare earth magnets for example) currently used in Power and Transmission modules of all types ITC and Electric Vehicle configurations.

In recent years the advances in electrical devices energy storage technologies and the general aim of societies to combat climate change has propelled and accelerated the development of electronnobility. The introduction of low emissions or emissions-free zones in towns and a changed political framework will speed up its expansion. Several entities are investing in electronnobility and are enhancing existing concepts, introducing technological innovations and charting their future applications. This invention is part of this necessary evolution of the current solutions to electronnobility to improve the sustainability of the materials used in the production of the power and transmission elements of the vehicle by reducing the amount used to obtain the same objectives.

The advantages of electronnobility are widely known to people educated in the art and can be shown not only by the indirect impact on reducing CO2 emissions and other harmful gases but also by their improved maintenance and reduced noise pollution. In addition, in the near future, severely congested and polluted town centers will be turned in to zero-emissions zones and thus only zero-emission vehicles will be able to drive through them.

The aim of the present invention is to provide an electric vehicle drive which is convenient to manufacture and/or reliable, and/or efficient. Other benefits will become apparent in description.

Current electromobility solutions have a high degree of efficiency of up to 96% compared with internal combustion engines that have an upper efficiency of 40%.

Efficiency is further improved by the ability of the propulsion motor to operate as a generator to recover braking energy to be re-used when needed.

The emergence of new Electric Vehicles of varying technologies has led to this solution. It removes the need for virtually all the existing Mechanical drive components incumbent in the existing vehicle designs seen today, which are costly and complicated.

In embodiments of the present invention this is ideally achieved by storing the braking energy in accumulators and then using this to power the motor as a generator to recharge the batteries, or to drive the system with increased power for short periods of time, ie; overtaking.

The unit is insulated to keep the heat in the system and subsequently turn this into electricity via a Heat Recovery System and use this to also recharge the batteries therefore further increasing the overall efficiency. Minimum energy loss through the heat produced in the system.

If used The Heat Recovery System can be utilised as the cooling system thus improving overall efficiency.

The cooling and Hydraulic system is a combined system, initially using a water/glycol based fluid which is encompasses the 'Green' ethos.

The solution proposed herein can be placed strategically in the chassis of any vehicle adopting this system for any advantage it may offer. This is made possible by eliminating all the generic mechanical power transfer elements.

The Motor/Generators being decoupled can be designed to run much faster than current solutions, thus reducing the quantity of rare earth magnet material required. This also further reduces the overall cost element, and allows greater freedom in the location of the major components for different types of vehicles This fully integrated hydro-electric propulsion unit is smaller, lighter, more efficient, less complicated and more cost effective than existing vehicle drive solutions. It decouples the drive to.

It can have more than one Motor/Generator which can allow full optimization for Powering or Charging the storage systems independently, or at the same time.

This High-speed compact Permanent Magnet Motor/Generator can reduce size and weight and further improves the efficiency of the vehicle.

This invention optimizes the use of the Electro/hydraulic transmission approach, by opening the possibility to increase energy storage capability, by the utilization of two types of energy storage, namely, hydraulic storage and battery storage systems. The hydraulic system is used to reduce the battery rate of charge and discharge at starting and braking and thus increases its life.

The design of this system seeks to eliminate all the fundamental existing mechanical transmission elements of current Electric Hybrid and ICE solutions.

The accumulators can also be independently charged externally by compressed air temporarily attached to inlets provided if required.

SUMMARY OF THE INVENTION

According to the present invention, there is provided an electromobility Power unit as defined in claim 1.

According to the present invention, there is provided an electromobility Power Module solution that uses an electro/hydraulic architecture that decouples the drive from the transmission system.

According to the present invention, it allows greater degrees of freedom in the location of the major components for different types of vehicles to achieve optimal weight distribution and for performance vehicle low center of gravity.

According to the present invention, the location of the Power Module drives the location of the center of gravity and can improve the vehicle's handling and road holding characteristics.

According to the present invention, the Power Module eliminates the driveshafts and associated transmission components thus reducing the overall part count and simplifying the complete mechanical design Preferably, the Power Module can operate at substantially constant high-speed to reduce its size and weight and further improves the efficiency of the vehicle.

Preferably, the hydraulic storage system in combination with the battery storage provides redundant energy storage solutions. The hydraulic storage system reduces the charge and discharge rate on the battery thus increases its life This invention allows for multi wheel driven-vehicle architectures without complicated mechanical drive systems.

The fully integrated hydro-electric propulsion unit that is smaller, lighter, more efficient, less complicated and more cost effective solution to existing vehicle drive solutions. It decouples the drive to allow greater freedom in the location of the major components for different types of vehicles It can have more than one Motor/Generator which can allow full optimization for Powering or charging the storage systems independently, or at the same time.

BRIEF DESCRIPTION OF THE DRAWINGS

FIG. 1a is a schematic of the general Electro-Hydraulic Power Module Assembly

In another embodiment a single hydraulic power supply to a multiway distribution valve which can be used so as to distribute the power to the individual wheel to achieve vectored steering and torque control.

Figure 7:
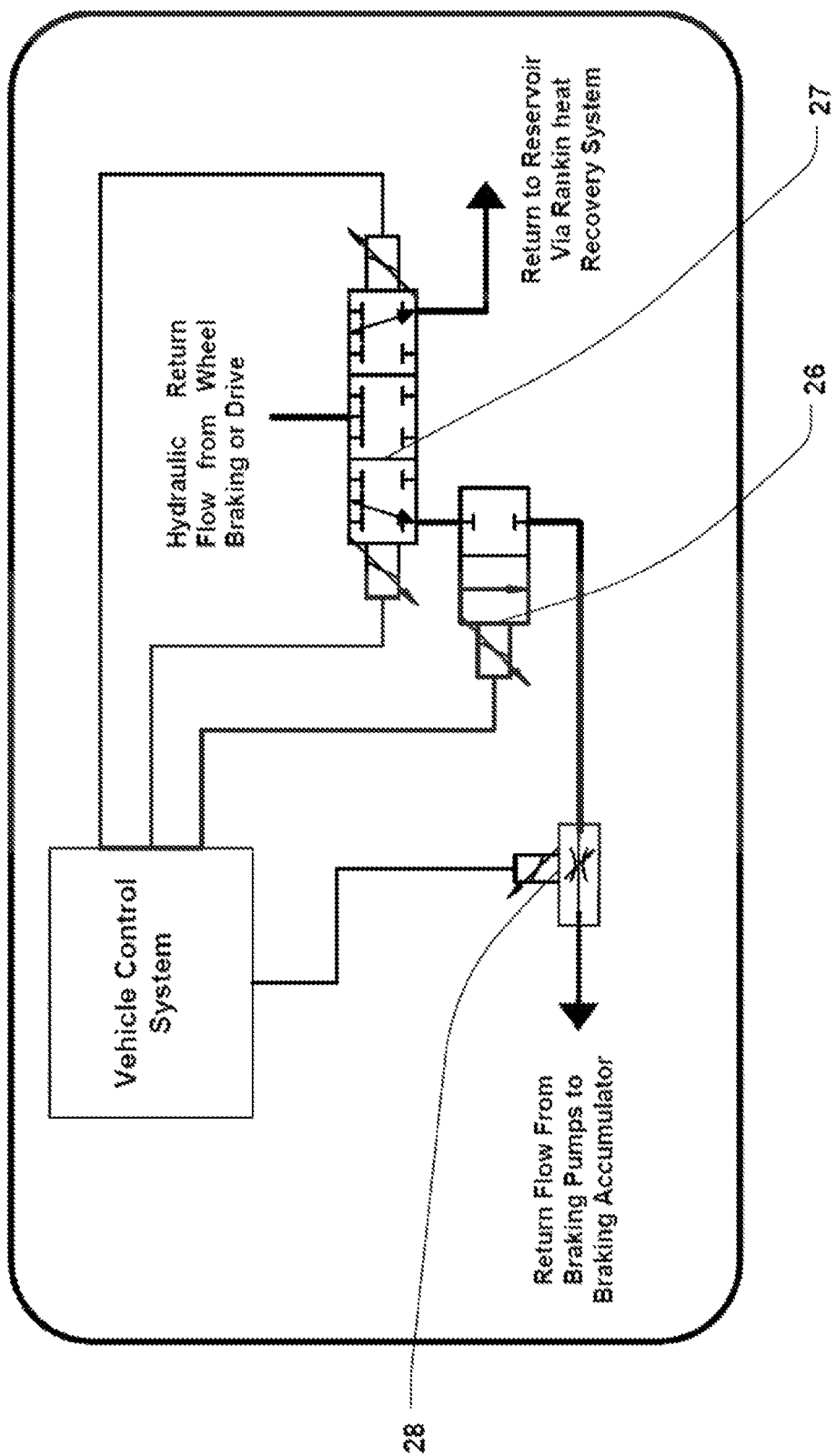

FIG. 7 is the detailed schematic showing the valve control system to distribute the hydraulic power generated under braking from the wheel pumps to the accumulators.

Figure 8:
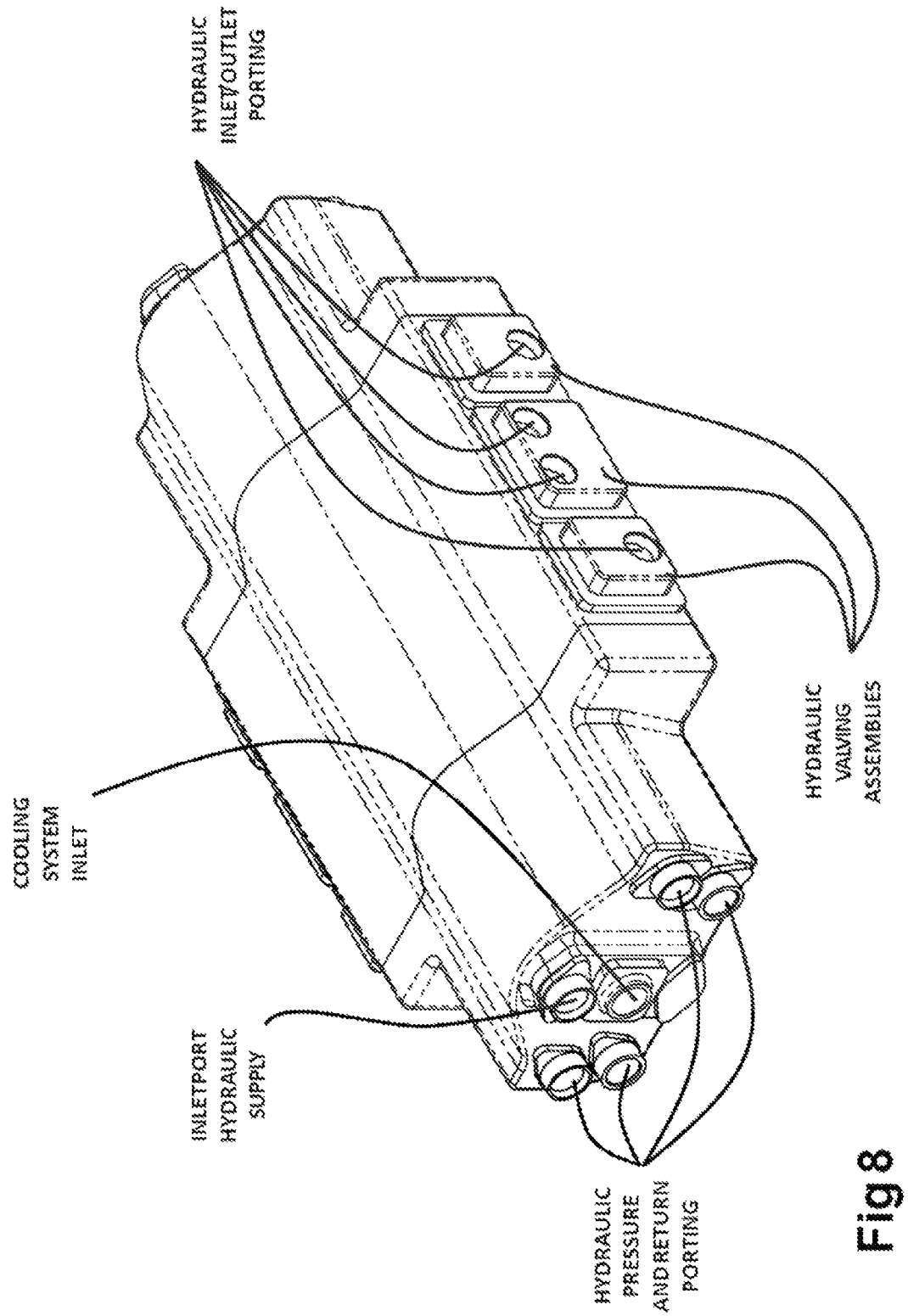

FIG. 8 is a 3D view of the power module

Figure 9:
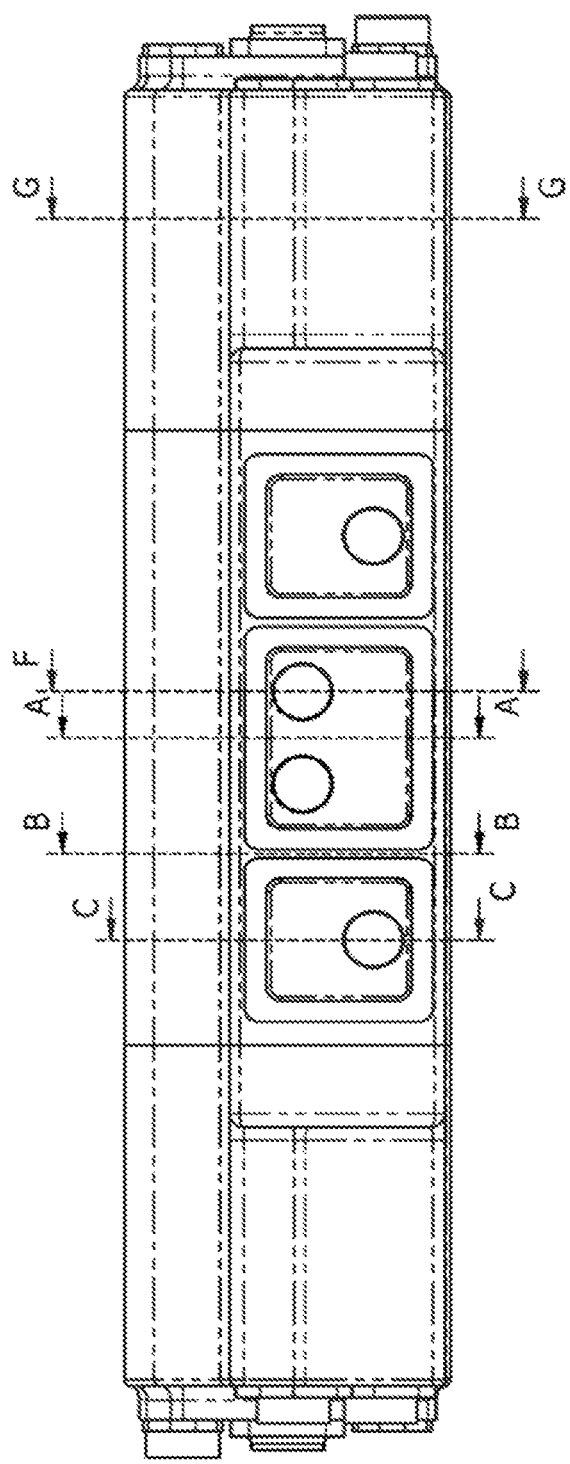

FIG. 9 is a side view of the power module showing the positions of the section views, A-A, B-B, C-C, F-F, and G-G also showing the hydraulic valve inlet/outlet porting configurations.

Figure 10:
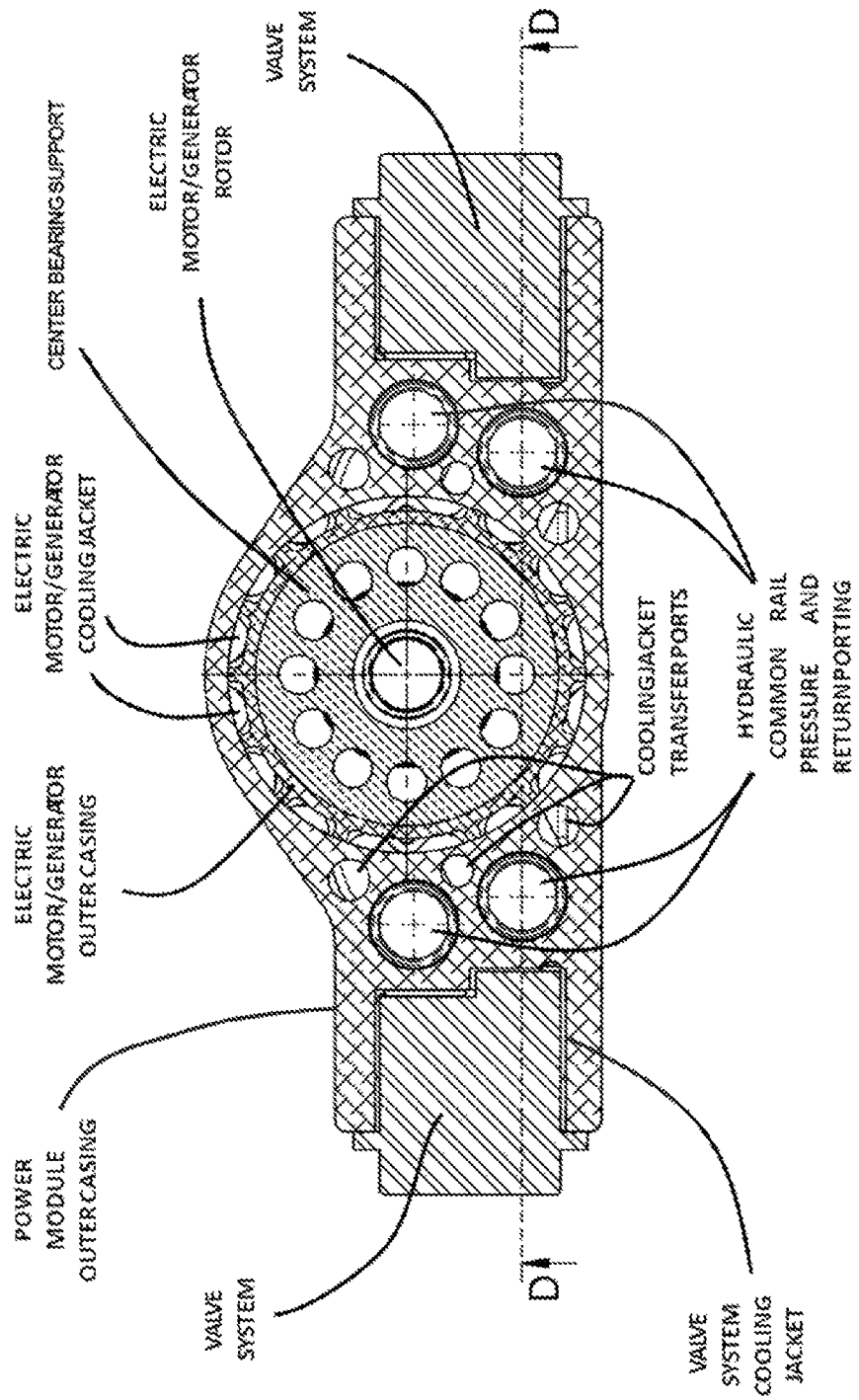

FIG. 10 is showing the detailed section A-A through the power module, and showing the position of section D-D.

Figure 11:
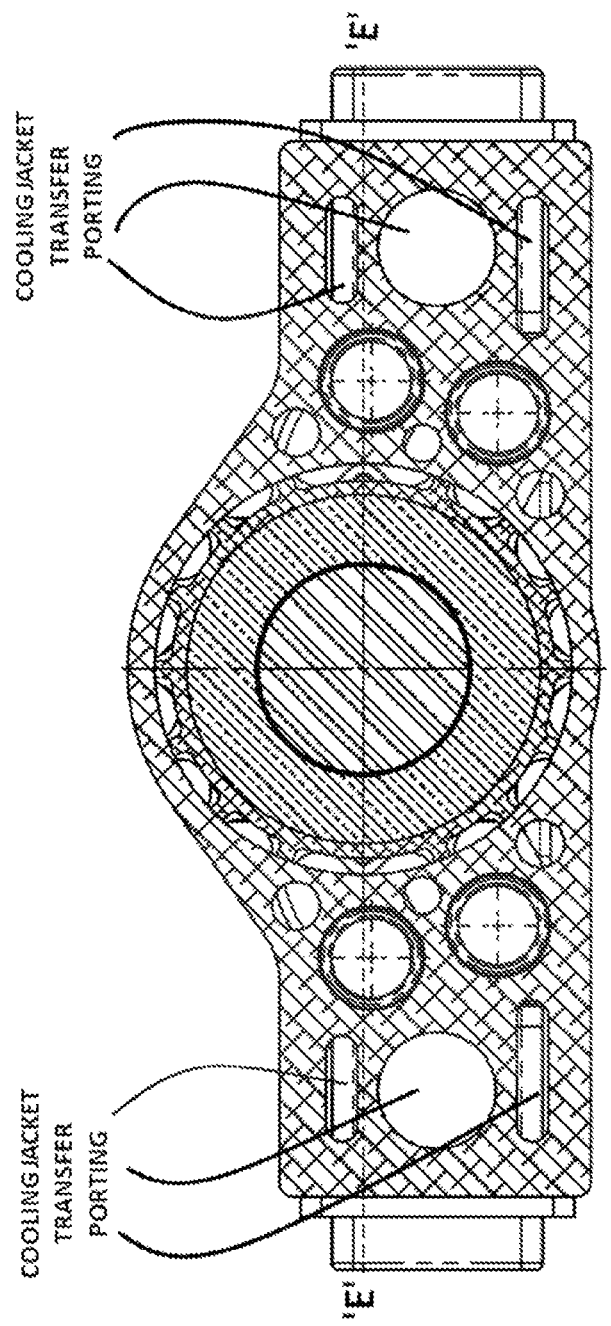

FIG. 11 is showing the detailed section B-B through the power module, and showing the position of section E-E.

Figure 12:
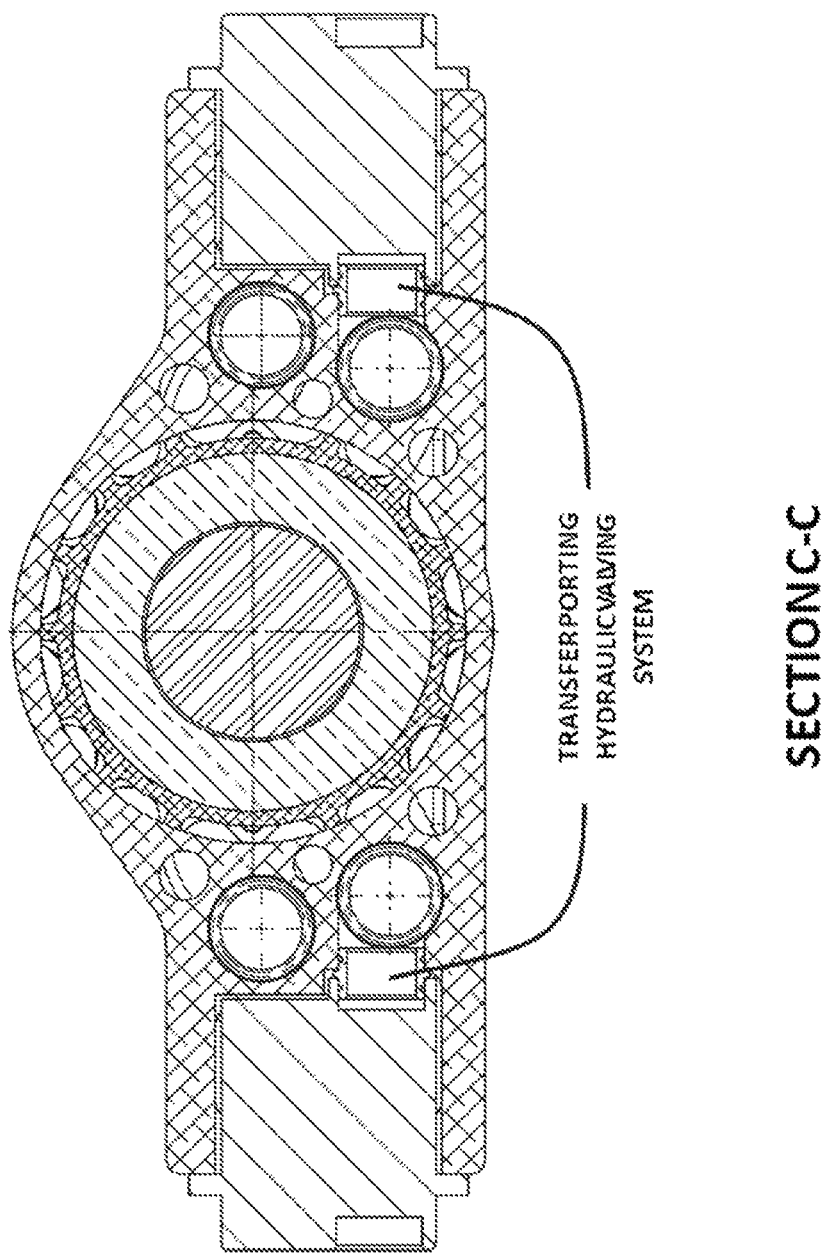

FIG. 12 is showing the detailed section C-C through the power module.

Figure 13:
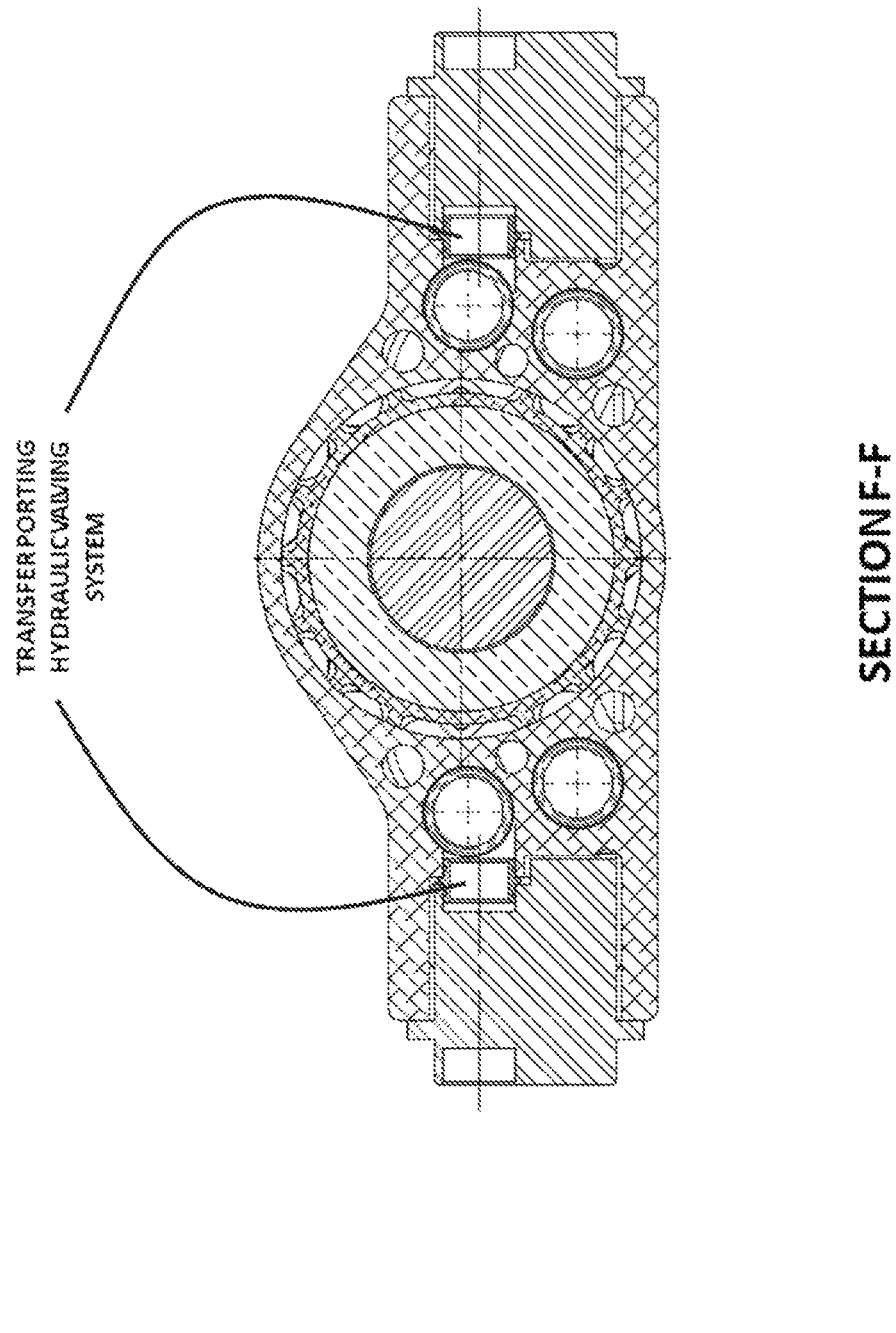

FIG. 13 is showing the detailed section F-F through the power module.

Figure 14:
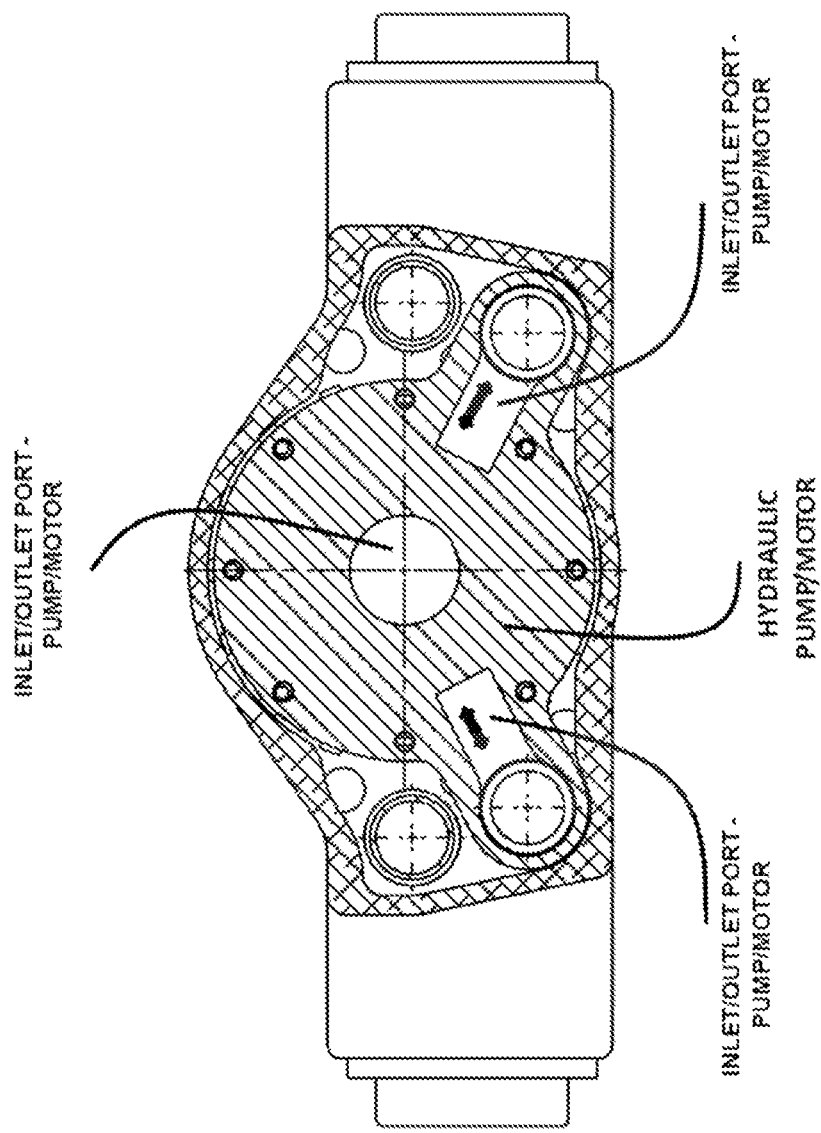

FIG. 14 is showing the detailed section G-G through the power module.

Figure 15:
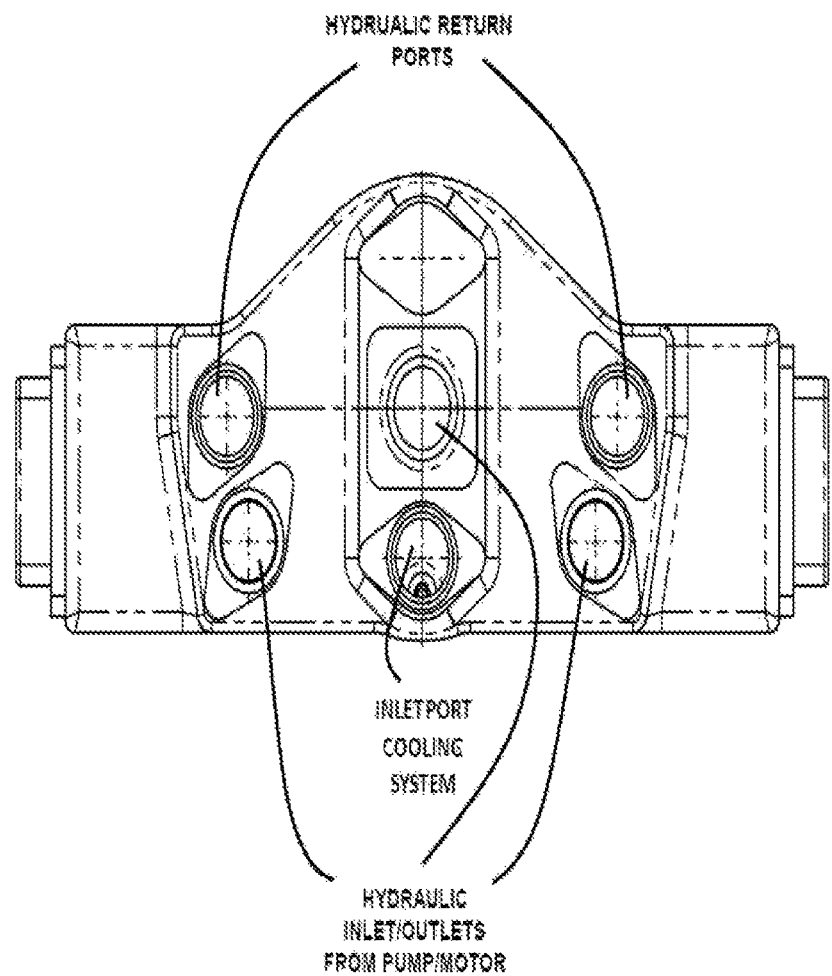

FIG. 15 is showing a detailed end view of the power module showing the inlet/outlet porting for the cooling and hydraulic systems.

Figure 16:
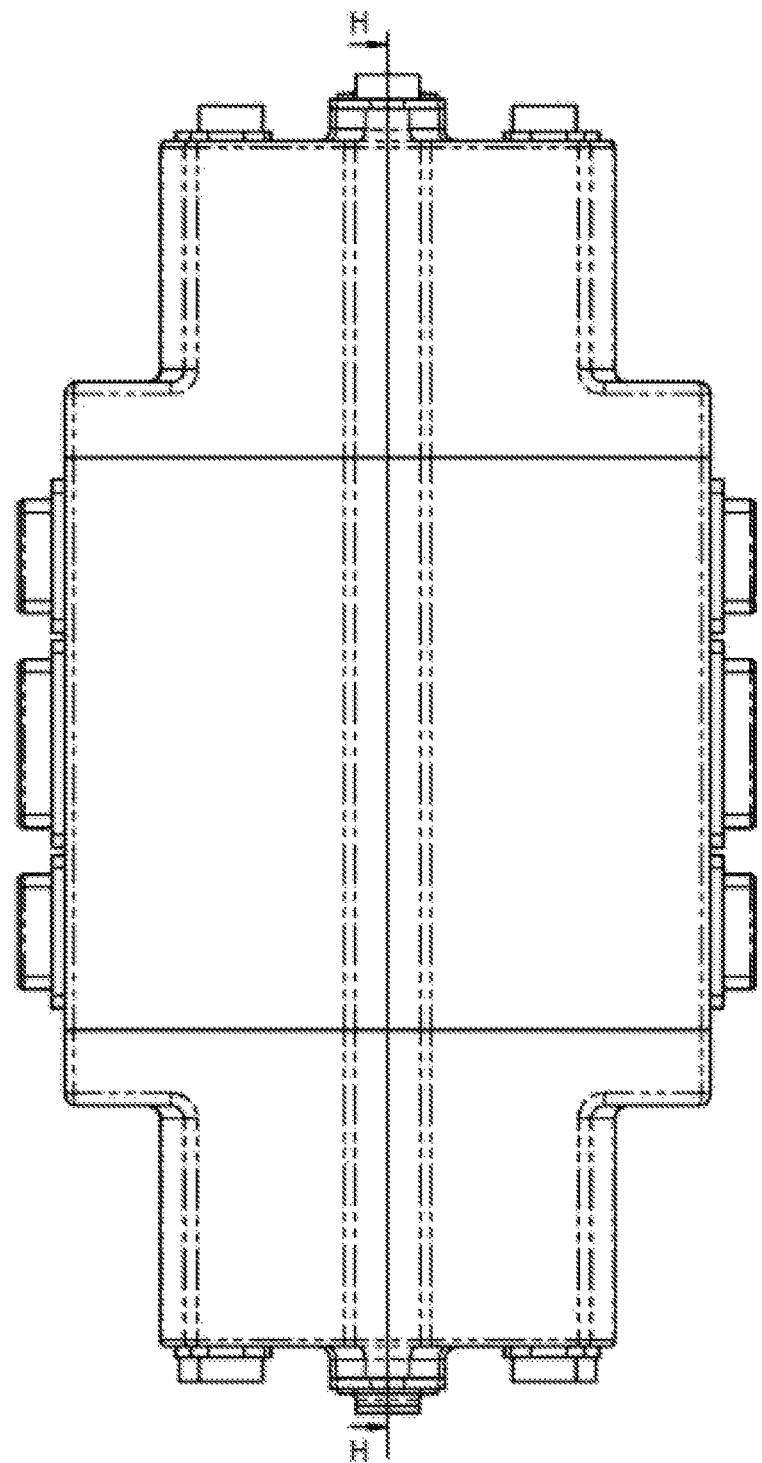

FIG. 16 is showing a bottom view of the power module, and showing the position of section H-H.

Figure 17:
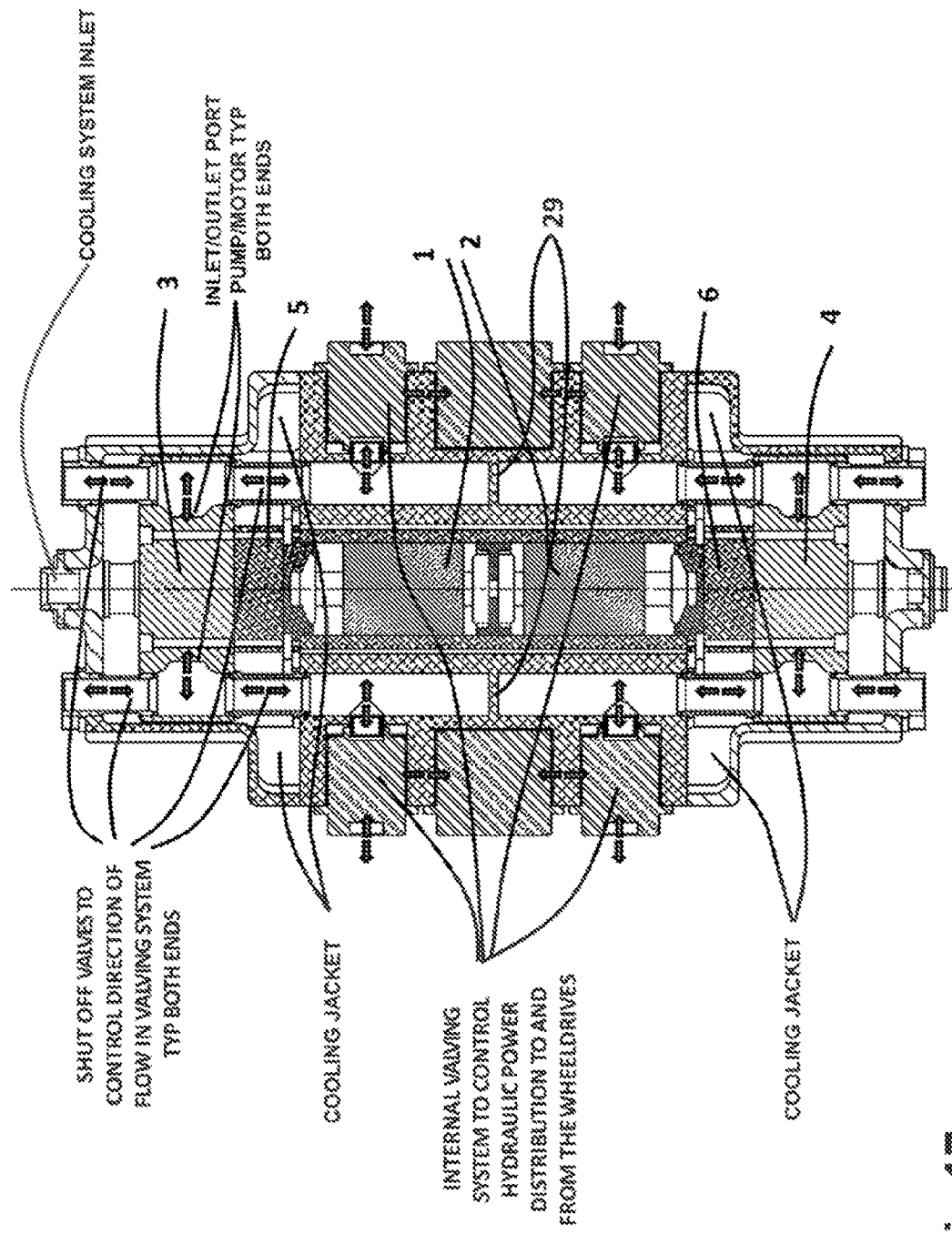

FIG. 17 is showing the detailed section D-D through the power module, showing the porting for the high-pressure supply from the pump/motor.

Figure 18:
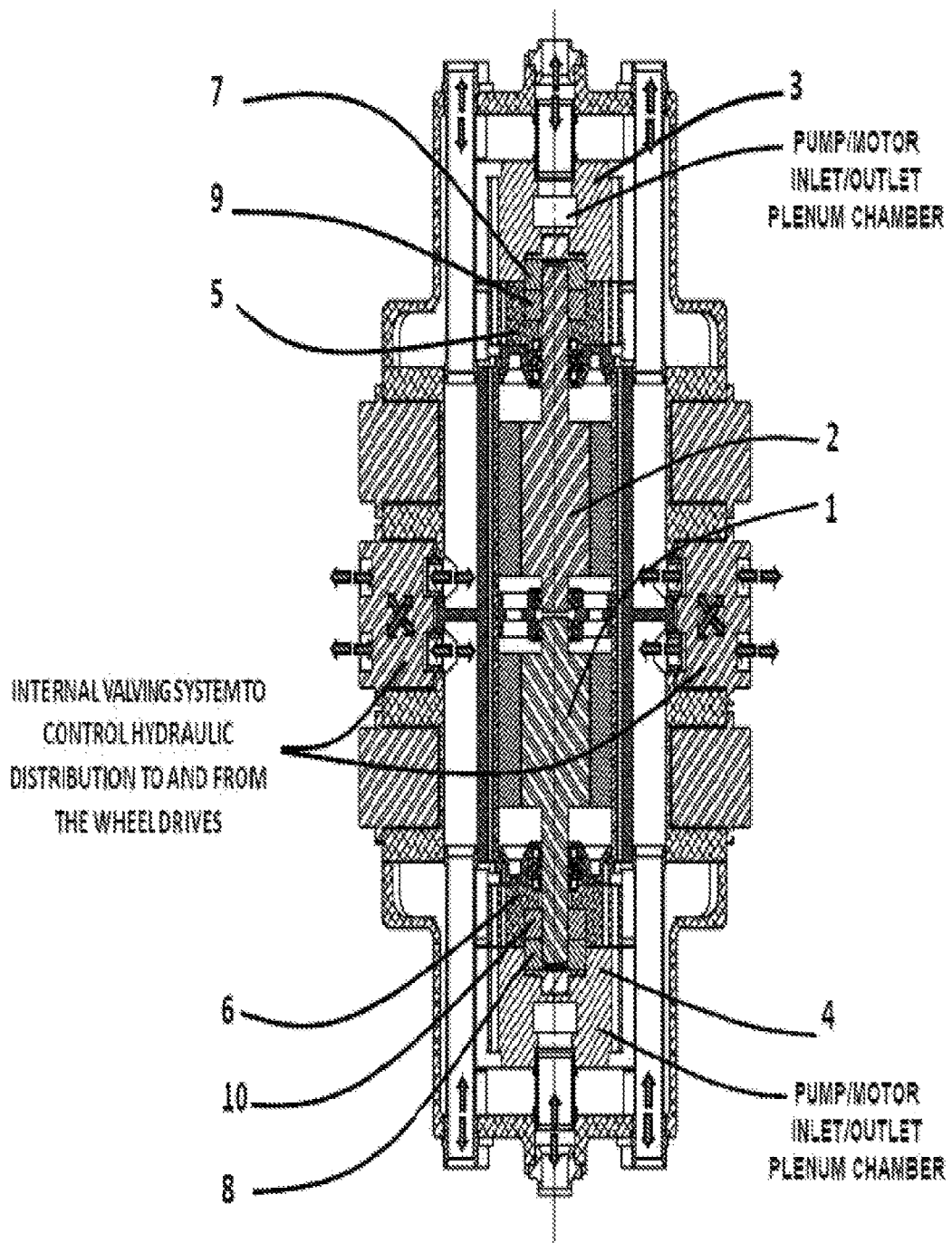
Figure 19:
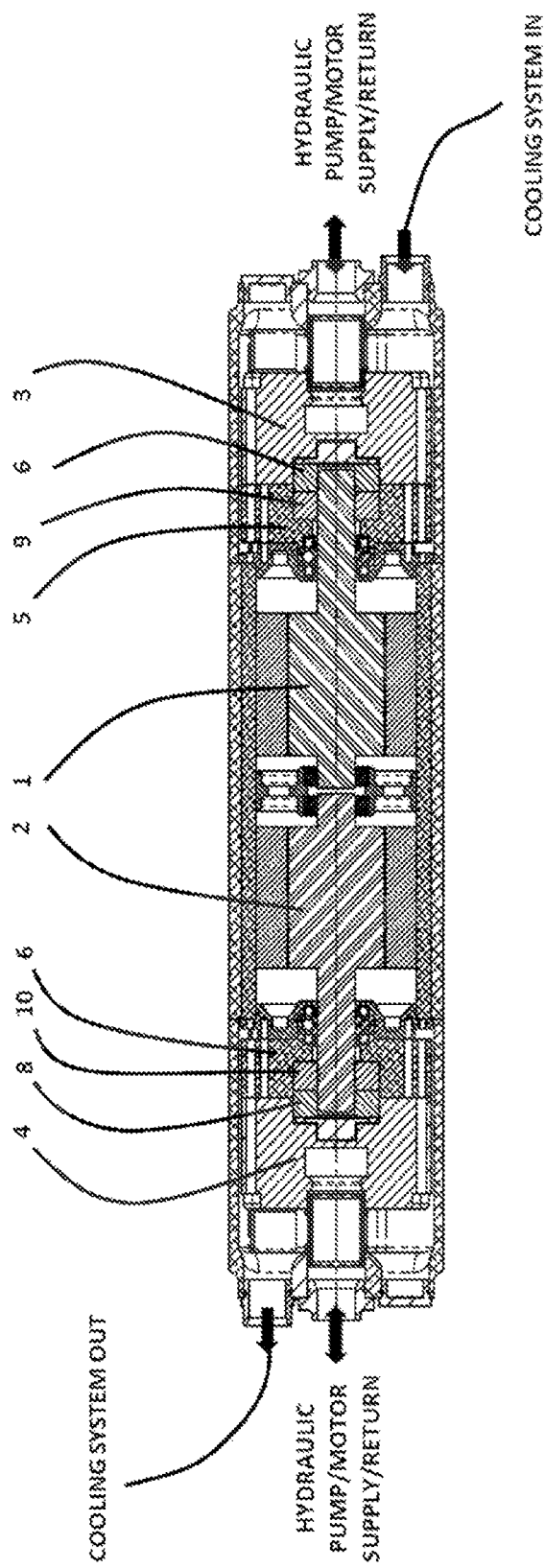

FIG. 18 is showing the detailed section E-E through the power module, showing the hydraulic supply and return from the wheel pump/motors FIG. 19 is showing the detailed section H-H through the power module, showing the electric hydraulic drive system configuration.

Figure 20:
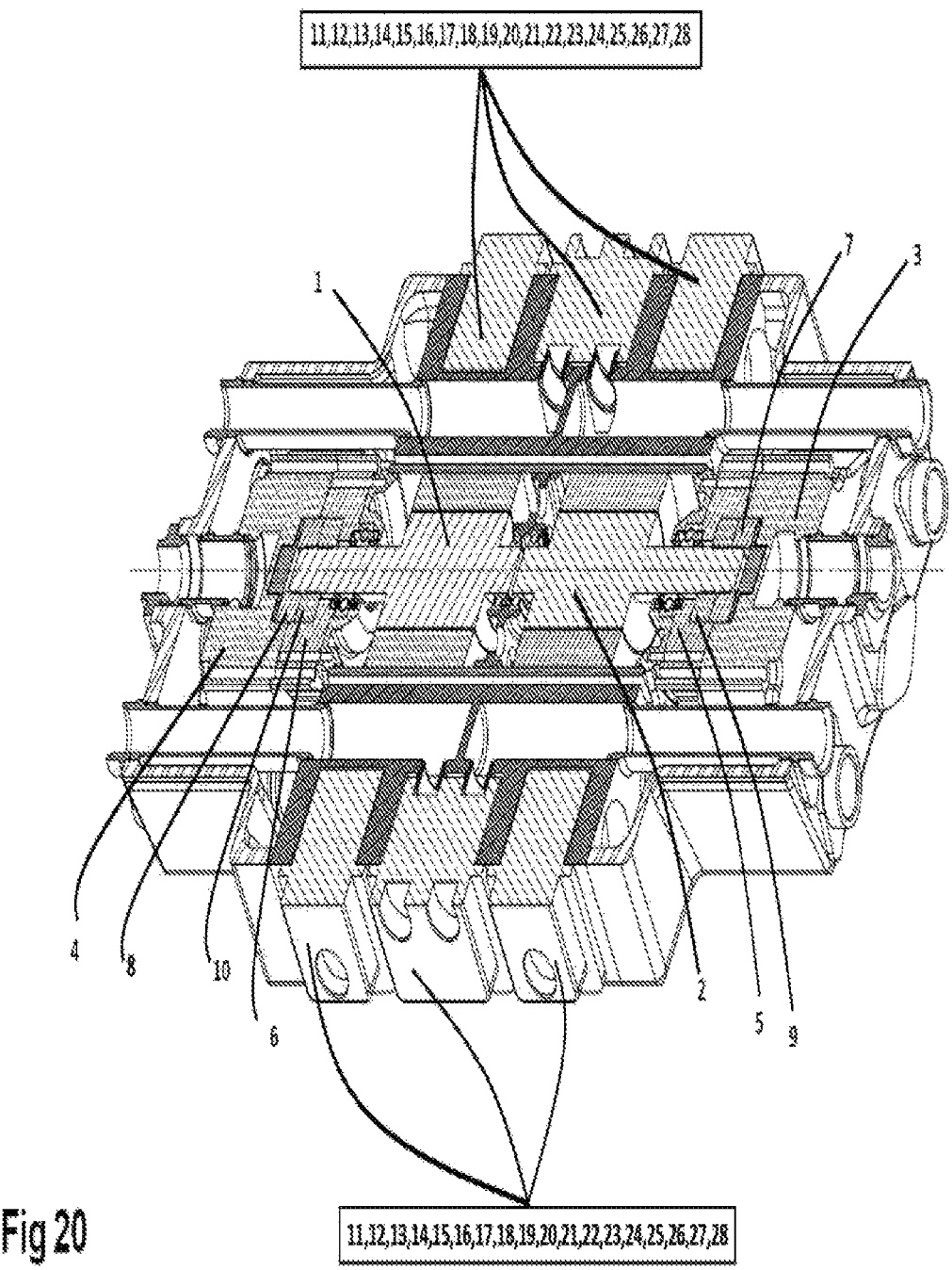

FIG. 20 is a sectional 3D view showing the major component distribution.

Figure 21:
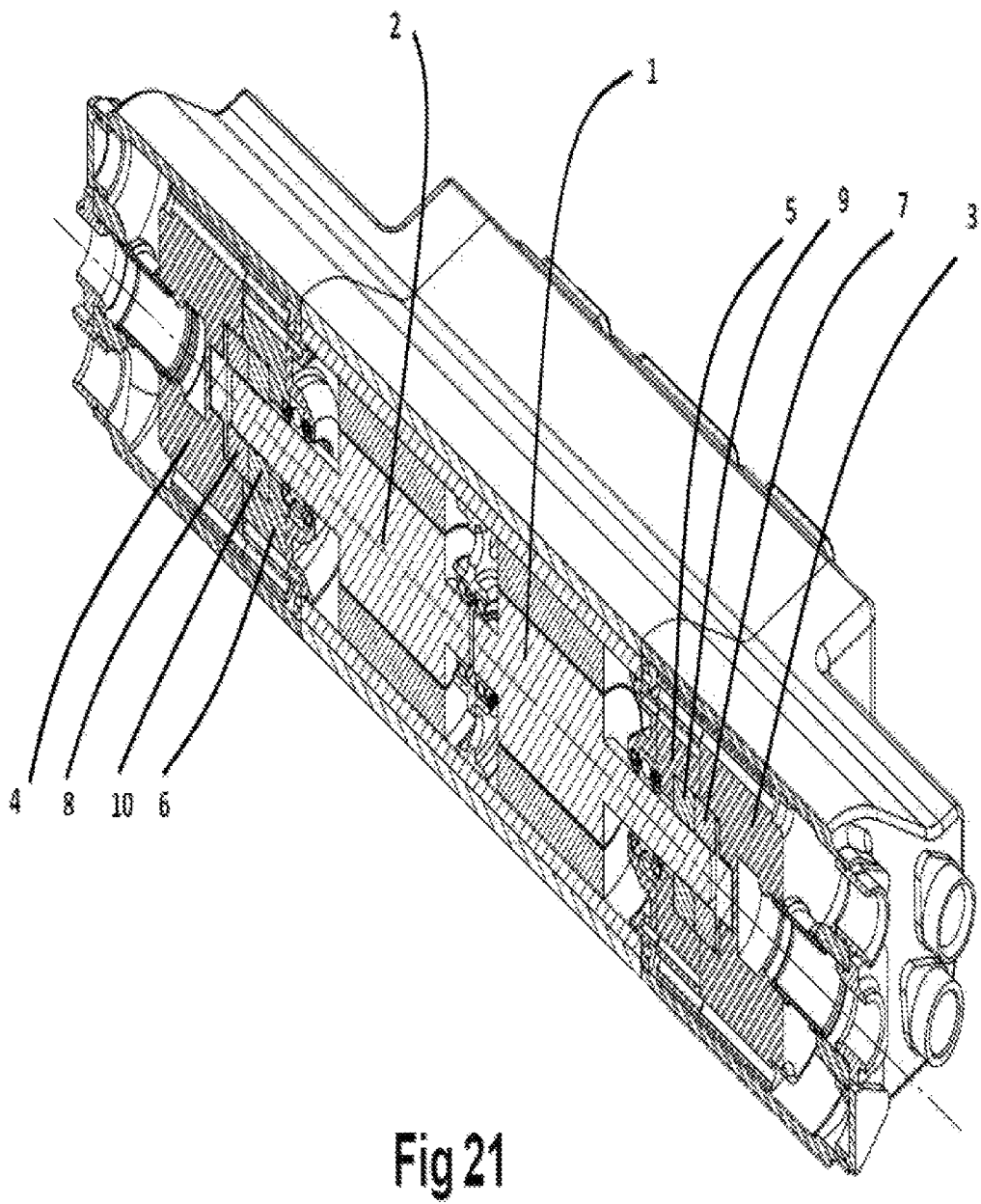

FIG. 21 is showing a detailed 3D section H-H showing the electric/hydraulic drive configuration for clarity.

DETAILED DESCRIPTION OF THE INVENTION

In the following description, numerous details are set forth to provide an understanding of the present invention. However, it will be understood by those of ordinary skill in the art that the present invention may be practiced without these details and that numerous variations or modifications from the described embodiments may be possible.

The present invention relates to an integrated Electro/Hydraulic Power Module and its practical implementation in a standard or a sports vehicle. However, the devices and methods of the present invention are not limited to usle in the specific applications that are described herein.

Figure 1B:
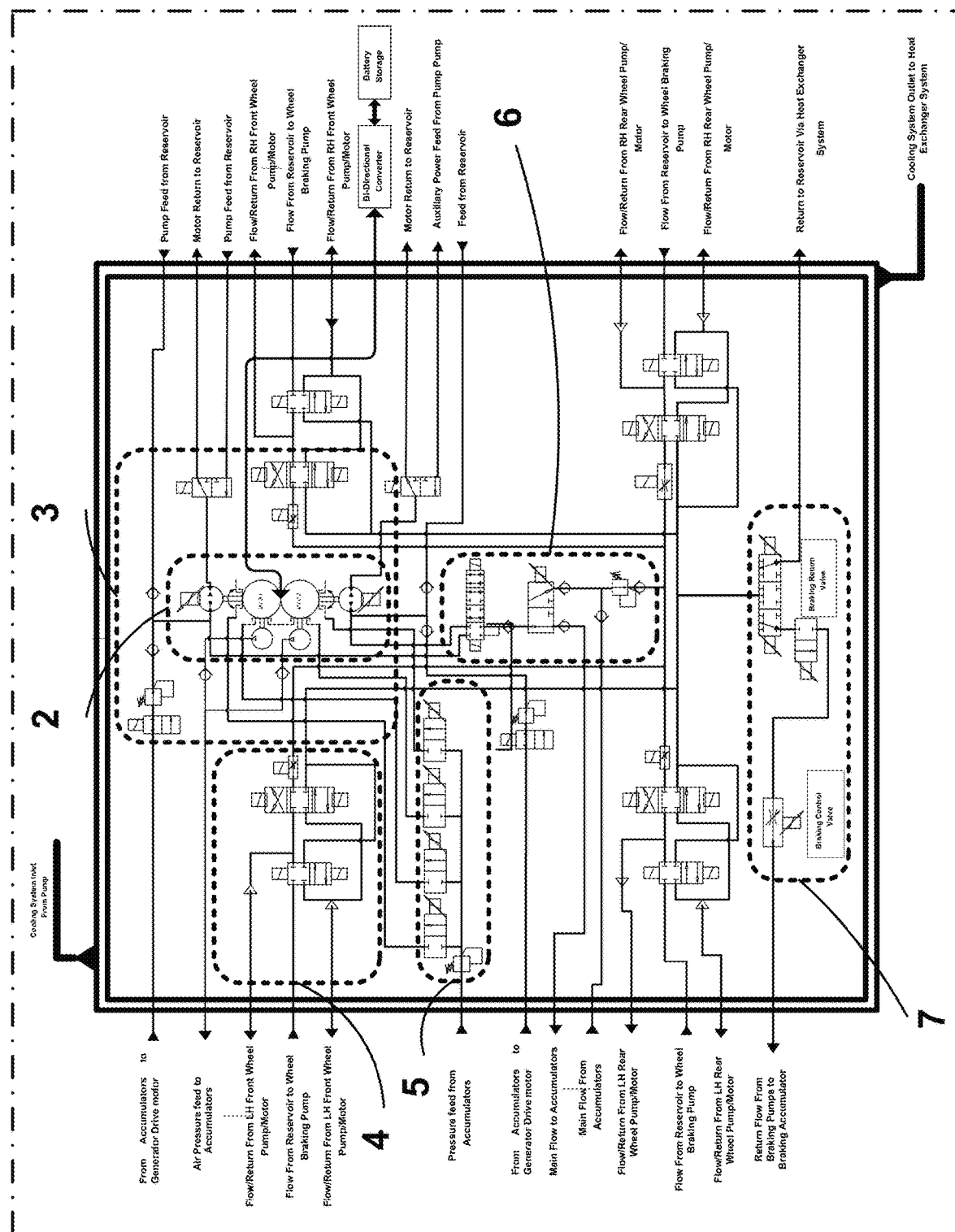
FIG. 1b is a schematic of the Electro-Hydraulic Power Module Assembly showing further details

Referring generally to FIG. 1 there is shown the schematic of a fully integrated electro/hydraulic power module that uses hydraulic power as means of power distribution and control.

A Motor/Hydraulic Integrated System includes an electric motor/generator which is driven by batteries, (or charges the batteries via the bi-directional converter), as controlled by charge controller and control system. The electric motor is connected to turbomachinery that controls the wheels of the vehicle via hydraulic lines to and from each wheel. The wheels are driven by a variable hydraulic Pump/Motor system, with an inbuilt hydraulic failsafe ABS system.

The integrated unit is water cooled as shown in FIG. 1, and is insulated to keep the heat in. A heat recovery system may also be included, for example an organic Rankine cycle heat to electric converter (which may use a peltier device to convert the heat to electricity) which can then be used to drive the motor or store electric power in the battery. The cooled hydraulic fluid from the converter can then be circulated back via a Sealed Hydraulic Reservoir to a Water Jacket surrounding the Motor/Hydraulic Integrated System by a Hybrid Unit Cooling System.

Figure 2:
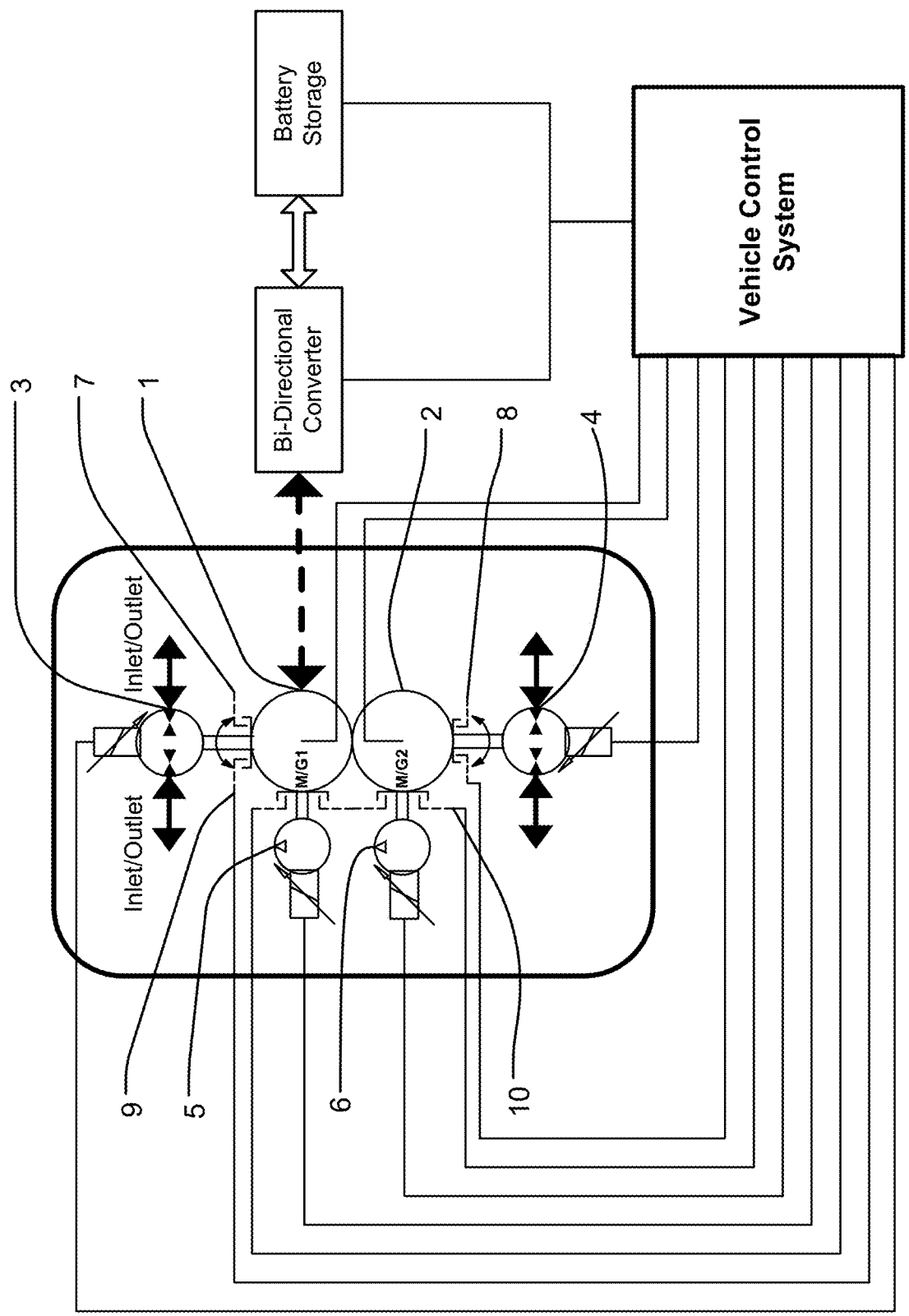
FIG. 2 is a schematic of the motor generator internal assembly

FIG. 2 is a schematic diagram which showing the key circuitry within the system and their interconnections, namely the integrated control valving and distribution to the input/output ports for the power module, wheel drive and braking, and the integrated Motor/Generators assembly.

Figure 3:
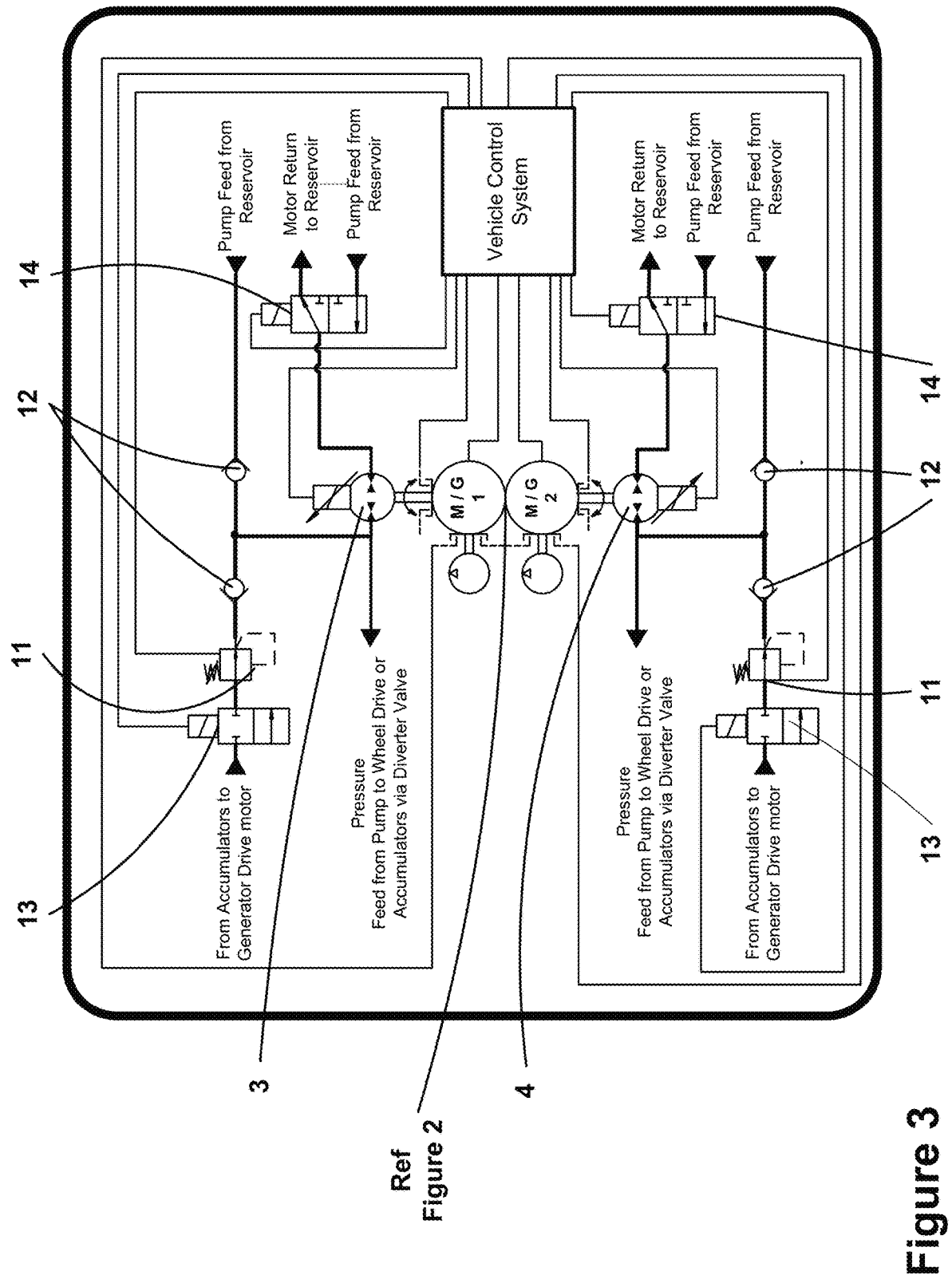
FIG. 3 is the detailed section of the schematic showing the integrated hydraulic valving system for the individual wheel drives

Referring to FIG. 2. the whole power and drive system is shown, the subsystems of which will be discussed separately. Referring also to FIG. 3, the motor/generators assemblies 2, which are independently controlled integrated units within the Power Unit. The motor/generators 1 and 2, drive or are driven by the integrated hydraulic motors/pumps 3, 4, which are enabled via the clutches 7 and 8. This allows the system to utilize stored energy from the batteries or hydraulic accumulators to power the system. It also allows the stored braking energy from the hydraulic braking accumulators to charge the batteries.

It can also drive the integrated compressors 5 and 6, via the clutches 9 and 10, using hydraulic or electrical energy to pressurize the accumulators. The control system would regulate and activate the units 1 to 10 accordingly.

In motoring mode, the motor/generators 1 or 2, drive the pump assemblies 3 and 4.

The pump assemblies 3 and 4, via valve assemblies, 23, 24 and 25 (FIG. 6) can drive the wheels directly or pressurise the accumulator system which in both cases can provide power to the motor/pump units driving the wheels.

Referring to FIG. 3, there is shown the Schematic of the systems to drive Motor/Generators, via the Motors configuration of the Pump/Motors assemblies 3 and 4, via clutches 7 and 8, (Ref FIG. 2) and valves 11 to 14, as a generator using the power from the braking Accumulator to charge the batteries. Alternatively using the Pump configurations of the Pump/Motor assemblies 3 and 4, (FIG. 2) to supply Hydraulic power for other applications. The two Motor/Generators systems are independent of each other, and the applications available and the configuration at any one time is set by the control system; one Motor/Generator may be operating to pressurize hydraulic fluid, while the other Motor/Generator is acting to charge the batteries, or alternatively both Motor/Generators may be pressurizing hydraulic fluid simultaneously, or acting as generators to charge the batteries simultaneously.

The motor/generator M/G1, when driven as a motor, drives the integrated hydraulic motor/pump 3 to pressurize hydraulic fluid either to feed from Pump to the Wheel Drive or Accumulators via a Diverter Valve. Alternatively or addition, pressurized hydraulic fluid can be supplied to the wheel drive from the accumulator via direction valve 13, pressure release valve 11 and check valve 12. A reservoir communicates the hydraulic motors/pump 3 via a direction valve 14 which allows fluid to flow in either direction, and to the Wheel Drive or Accumulators via check valve 12.

The motor/generator M/G2, is connected to the Wheel Drive, Accumulators and reservoir by a second set of valves and a hydraulic motor/pump 4 set up in the same manner as the motor/generator M/G1.

Figure 4:
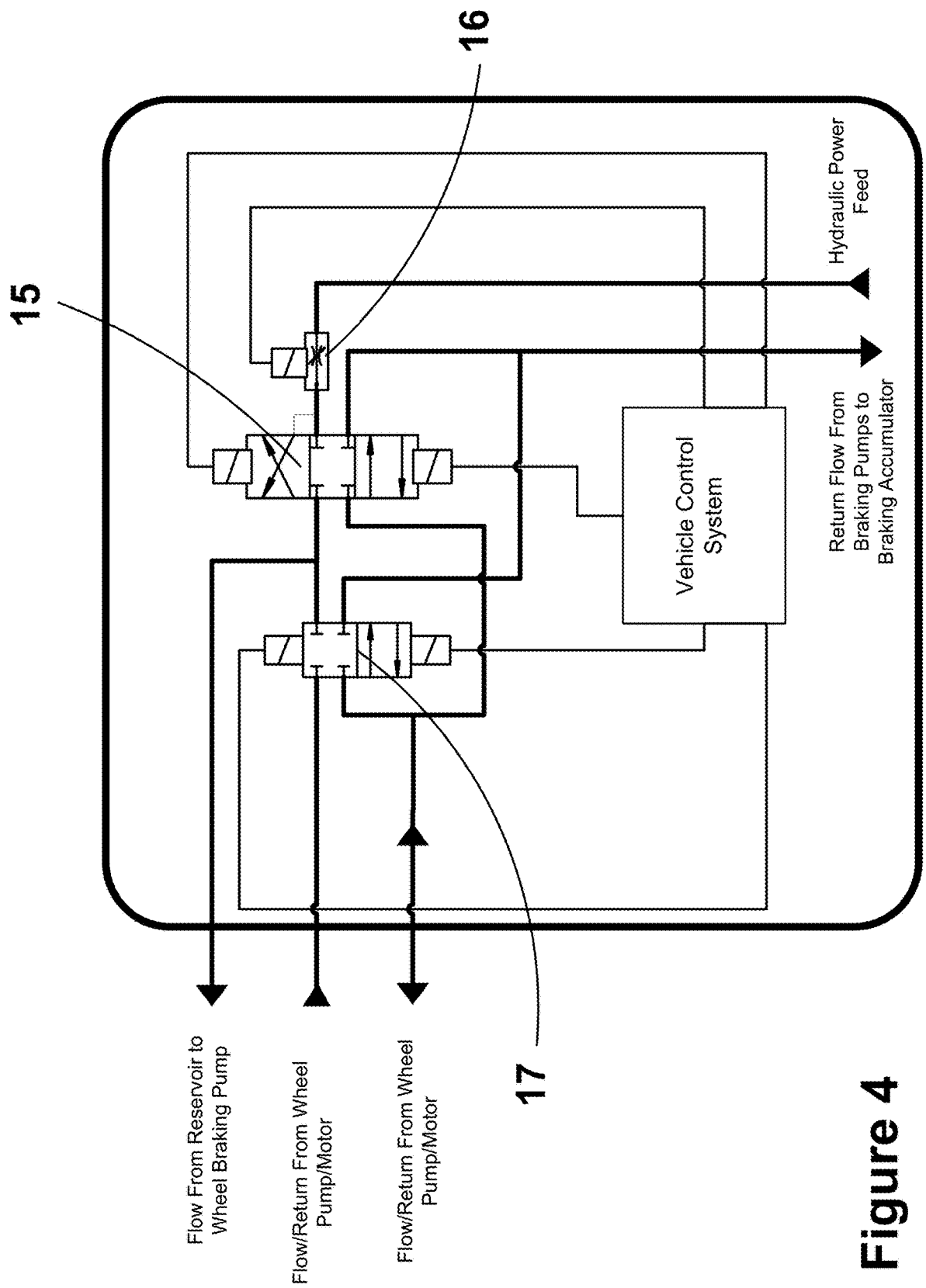
FIG. 4 is the detailed section of the schematic showing the individual wheel drive and braking control system

Referring to FIG. 4, there is shown the Schematic to control the hydraulic drive to and from the wheel Motor/Pumps and braking system on the one hand, and the accumulators, braking accumulators and/or the hydraulic motors/pumps 3, 4 using valves 15, 16 and 17 on the other hand. The configurations for these valves are set by the Vehicle Control System.

Figure 5:
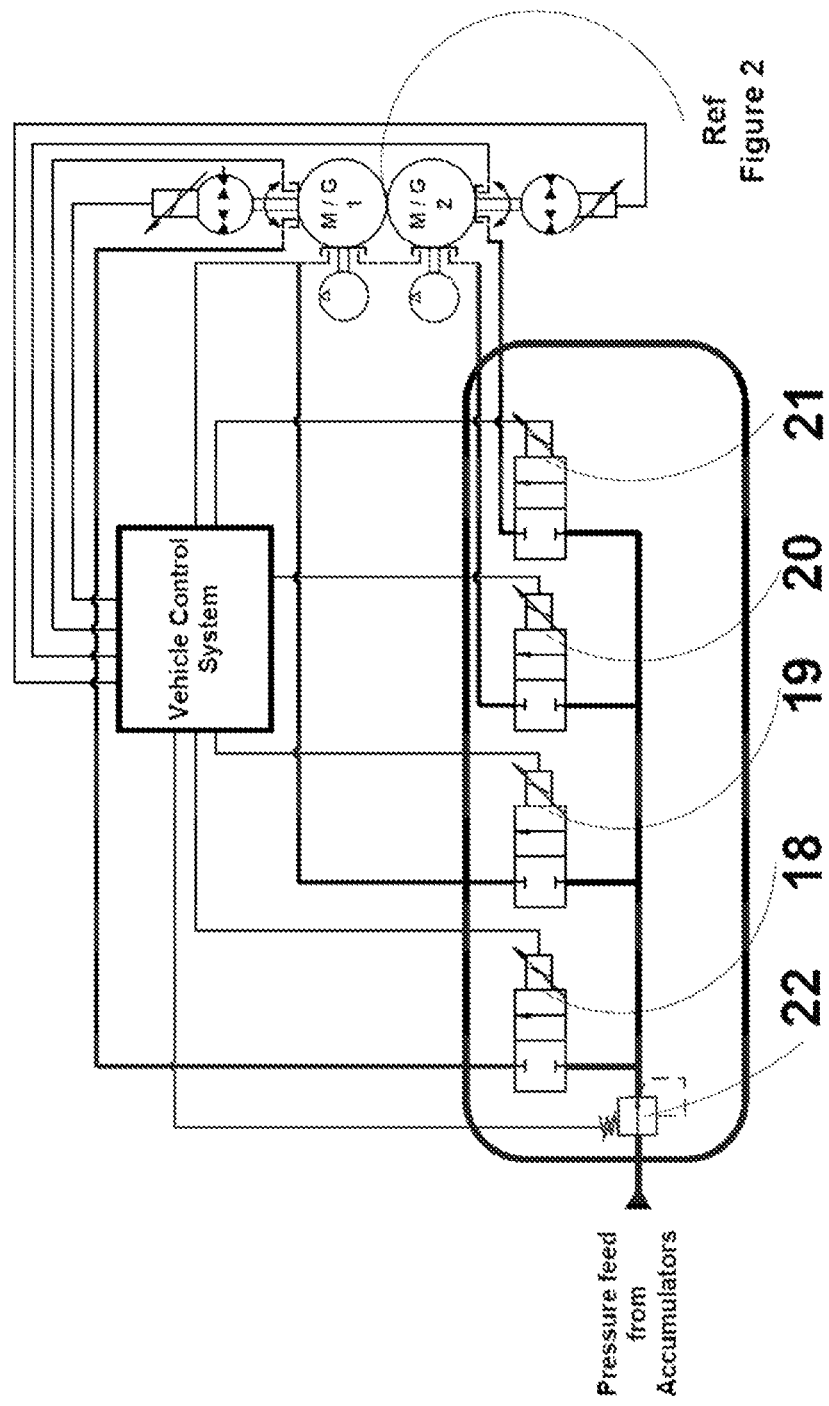
FIG. 5 is the detailed section of the schematic showing the valving for the control of the hydraulic clutches attached to the Motor/Generator.

Referring to FIG. 5, there is shown the schematic to control the actuation of the clutches 7, 8, 9 and 10 (shown in FIG. 2) of the via the valves 18, 19, 20, 21 and 22, according to the system requirement set by the Vehicle Control System. The actuation of the clutch is ideally effected by pressurized fluid from the accumulator.

Figure 6:
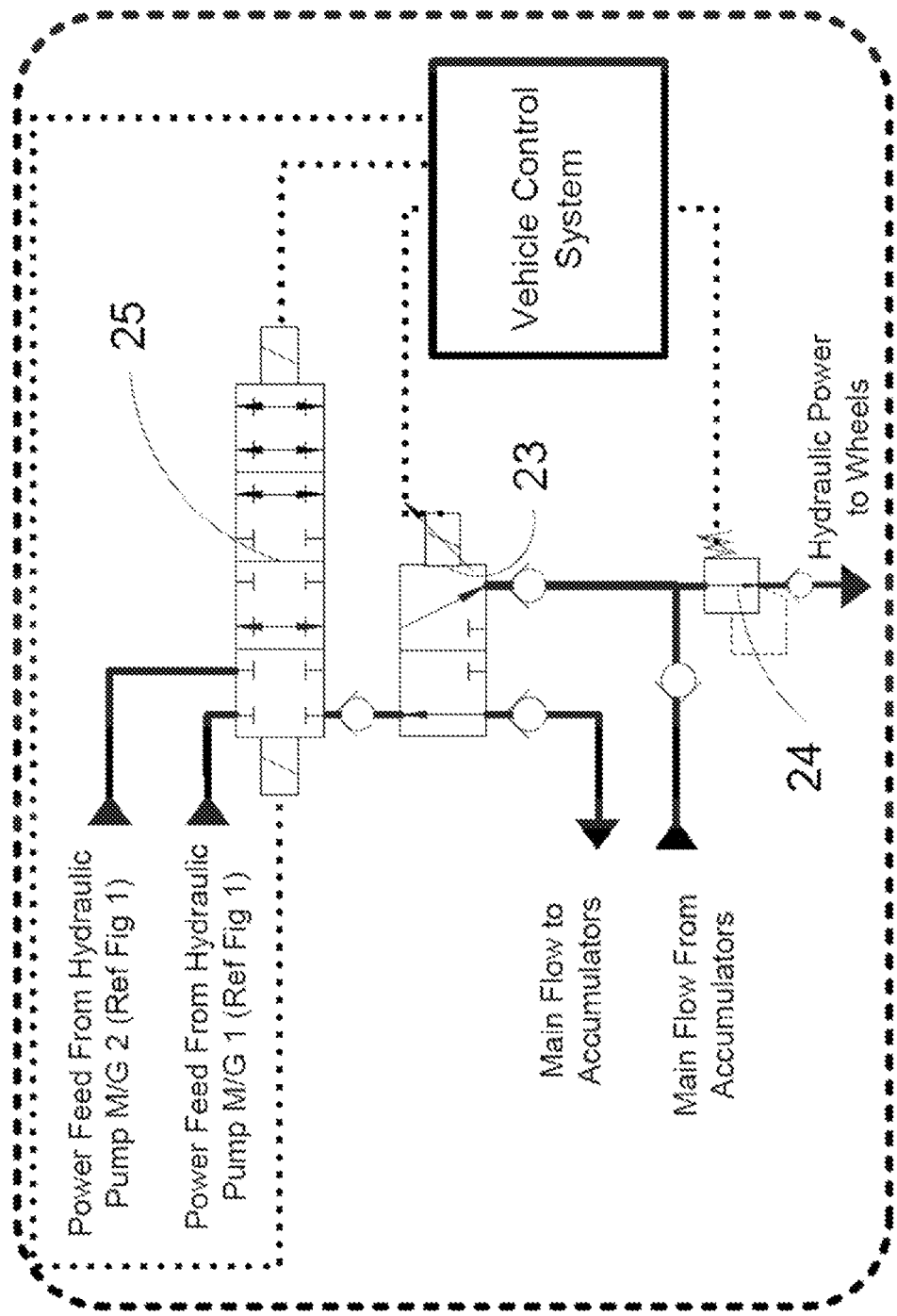
FIG. 6 is the detailed section of the schematic showing the hydraulic power supply valving to control the hydraulic power to the wheels from the accumulators or the electric motor.

Referring to FIG. 6, there is a shown the schematic to control the hydraulic power distribution from the Pumps 3 and 4 driven by Hydraulic Pumps M/G 1 and M/G 2, (Ref FIG. 2) via valves 23, 24 and 25, to either power the wheels directly or through the accumulator system, according to the system requirement set by the Vehicle Control System.

Referring to FIG. 7, there is shown the schematic showing the valves controlling the return flow from the wheel Pump/Motors. The valve 26, diverts the flow from the braking pump to the Accumulators via valves 27 and 28 or the drive return flow to the reservoir via the Heat Recovery System according to the system requirement set by the Vehicle Control System.

During braking, the power is extracted from the wheels via the wheel-mounted motor/pump units and the flow and pressure generated during the braking by the wheel-mounted motor/pump unit is stored in the braking accumulators. The stored energy can either be kept in the accumulators or can be used to drive the main motor/pump assembly (Ref FIG. 2). The power generated is processed by the bi-directional converter to charge the batteries. The logic of selecting storage versus charging the battery will be set to optimise the driving condition and the vehicle range. The logic for the optimal control of energy storage is embedded in the Vehicle Control System.

The bi-directional controller converts power drawn from the battery into the required input for the motor/generator; the conversion will depend on the battery and motor, but could, for example control the conversion of a DC battery output to a multiphase input for a switched DC motor. Likewise, the bi-directional controller will control the charging current energy from the motor/generator (or the compressor of the accumulator) is to be stored in the battery.

Referring to FIG. 8 and FIG. 9, there is shown the power module in its entirety indicating some of the major porting for the basic connections, and indicating the sections shown in the following figures. The power module houses the motor/generators M/G1 and M/G2 and the hydraulic motor/pumps 3, 4 as well as the connections to the hydraulic system, including the hydraulic supply inlet port, the hydraulic valving assemblies, the hydraulic inlet/outlet porting, the cooling system inlet and the hydraulic pressure and return porting which will be described further below.

Referring to FIG. 10, there is shown the orthographic view of section A-A through the Power Module, the positioning of some of the major components relative to this section, and the position of section D-D.

A power module outer casing houses the motor/generators M/G1 and M/G2, the hydraulic motor/pumps, and the directional valves. The two electric motor/generator rotors are conveniently arranged coaxially in series, and can operate independently. The power module outer casing housing is conveniently shaped to accommodate the diameter of the motor/generator rotor with a saddle shaped portion, while the valve assemblies do not require this thickness of housing. The electric motor/generator conveniently has an outer stator and an inner rotor mounted on center bearing supports, and is housed in a cylindrical electric motor/generator outer casing. A motor/generator cooling jacket surrounds the electric motor/generator outer casing, with cooling fluid being supplied for circulation through cooling jacket transfer ports. The valve system is located on the lateral portions of the power module outer casing, and also has a valve system cooling jacket. Four hydraulic common rails for each motor/generator supplying pressure and return porting run along the long axis of the power module, having partitions 29 (shown in FIG. 17) between the rails each motor/generator, so that the bores of each rail exit at both ends of the casing as shown in the other diagrams. Instead of partitions 29, the rails could be combined through valving.

Referring to FIG. 11, there is shown the orthographic view of section B-B through the Power Module, indicating the position of the cooling jacket transfer porting in this section, and the position of section E-E.

Referring to FIG. 12, there is shown the orthographic view of section C-C through the Power Module, indicating the positioning of the transfer porting for the hydraulic valving system (in this figure, controlling the communication with the two lower hydraulic rails) relative to this section.

Referring to FIG. 13, there is shown the orthographic view of section F-F through the Power Module, indicating the positioning of the transfer porting for the hydraulic valving system (in this figure, controlling the communication with the two upper hydraulic rails) relative to this section.

Referring to FIG. 14, there is shown the orthographic view of section G-G through the Power Module, indicating the positioning of the inlet/outlet ports for one of the pump/motors; the pump/motor to pressurizes the fluid in the lower two hydraulic rails, or alternatively the hydraulic rails can operate the motor/generator to generate electric power to recharge the battery.

Referring to FIG. 15, there is shown the orthographic end view of the Power Module, indicating the positions of the hydraulic common rail inlet/outlet porting, and the cooling system inlet port.

Referring to FIG. 16, there is shown the orthographic bottom view of the Power Module, and the section H-H.

Referring to FIG. 17, there is shown the sectional view of section D-D through the Power Module, indicating the pressure supply and return flow options from the valving system relative to the pump/motors.

Motor/generators assemblies 1, 2 drive or are driven by the integrated compressors 5 and 6 and hydraulic motors/pumps 3, 4, to supply or take pressurize fluid from the hydraulic rails (here, the lower rails) running axially along the power unit. Shut off valves (typically at both ends) control direction of flow in valving system. Internal valving controls hydraulic power distribution to and from the wheel-drives coming off the lateral sides of the power unit. A cooling jacket is supplied by a cooling system inlet, with an outlet at the opposite end.

Referring to FIG. 18, there is shown the sectional view of section E-E through the Power Module, indicating internal valving system options to control the hydraulic return distribution to and from the wheel drives. A further internal valving system controls hydraulic distribution to and from the wheeldrives, in this section taken from the upper hydraulic rails. A pump/motor inlet/outlet plenum chamber is provided for to the integrated compressors 5 and 6, which engage with the motor/generators assemblies 1, 2 via clutches 7 and 9, and 6 and 10.

Referring to FIG. 19, there is shown the orthographic view of section H-H through the Power Module, indicating the cooling system through flow, the position of the hydraulic pump/motor supply/return flow options and the positions of some of the major components relative to this section.

Referring to FIG. 20, there is shown a semi-transparent 3-dimensional view of the power module indicating the major component distribution.

Referring to FIG. 21, there is shown a 3-dimensional view of section H-H through the power module indicating the major component distribution, and the clutch drive configuration to the Pump/Motors and the compressor units.

The system described herein includes two motor/power generators. It would also be possible to drive an electric/hydraulic vehicle with a single motor/power generator in a casing according to the design (with the appropriate modification of the casing valving and hydraulic rails). Including two motor/power generators allows a single motor to be used, particularly when cruising at a constant speed which would increase the efficiency; the second motor/power generator could then be activated for small deviations if necessary. In particular, the second motor/power generator hydraulic pump can supply additional power to accelerate the car when the first motor/power generator is supplying a constant power (particularly when a car is cruising, the requirement for acceleration may be short-lived and transitory); conversely, when the car is slowing, the second motor/power generator can be used to recapture excess energy from the hydraulic system and regenerative braking (again, particularly when a car is cruising, periods of braking or slowing may be short-lived and transitory).

When braking, the increasing in hydraulic pressure may be too sudden for the second motor/power generator to immediately convert the excess pressure to electricity and for this to be used to charge the battery. The pressurised fluid can then be stored in the accumulator until the second motor/power generator can use it to charge the battery. This allows an increase in the regenerative power to be harvested, and an increase in battery life by allowing smoother charging and discharging.

The accumulator is particularly responsive to transitory demands for either supplying or storing energy by means of the pressurised fluid; thus, the two motor/power generators and the accumulator can be operated so that the change in speed of one or both motor/power generators is minimised during the operation of the car, leading to more efficient operation and less wear on the parts.

The invention claimed is:

1. A vehicle drive system, comprising
a battery;
a main power unit in a housing, comprising:
two independent electric motor/generator, capable of being driven as a motor by the battery or of charging the battery as a generator;
at least one hydraulic motor/pump, capable of being driven by the electric motor/generator to pressurize hydraulic fluid, or of being driven by pressurized hydraulic fluid to power the motor generator as a generator;
a hydraulic rail communicating the pump; and
directional control valves communicating with the hydraulic rail;
two independent electric motor/generators, each electric motor/generator capable of being driven as a motor by the battery or of charging the battery as a generator, each electric motor/generator connected to a separate hydraulic motor/pump, the independent electric motor/generators and their connected hydraulic motor/pumps capable of acting independently;
two hydraulic motor/pumps, each coupled to a respective electric motor/generator, capable of being driven by the respective electric motor/generator to pressurize hydraulic fluid, or of being driven by pressurized hydraulic fluid to power the motor/generator as a generator;
a hydraulic rail communicating with the hydraulic motor/pumps directional control valves;
at least one accumulator for storing pressurized hydraulic fluid;
wheel drives capable of being driven by pressurized hydraulic fluid;
a hydraulic circuit connecting the directional control valves of the motor housing to the accumulator and wheel drives; and
a control system for controlling the operation of the battery, power unit and wheel drives.

2. The vehicle drive system, according to claim 1, wherein the hydraulic rail communicates with more than one valve.

3. The vehicle drive system, according to claim 1, wherein the housing is formed from an integral body, with bores for the one or more motor/generators, and at least one directional control valve located within the body.

* * * * *